United States Patent
Roussel et al.

(10) Patent No.: US 7,991,246 B2
(45) Date of Patent: Aug. 2, 2011

(54) IMAGE DEINTERLACING

(75) Inventors: Jerome Roussel, Grenoble (FR); Pascal Bertolino, Grenoble (FR); Marina Nicolas, Voreppe (FR)

(73) Assignee: STMicroelectronics S.A., Montrouge (FR)

( * ) Notice: Subject to any disclaimer, the term of this patent is extended or adjusted under 35 U.S.C. 154(b) by 991 days.

(21) Appl. No.: 11/855,936

(22) Filed: Sep. 14, 2007

(65) Prior Publication Data

US 2008/0089614 A1 Apr. 17, 2008

(30) Foreign Application Priority Data

Sep. 15, 2006 (FR) .................................. 06 08101

(51) Int. Cl.
 *G06K 9/32* (2006.01)
 *H04N 7/01* (2006.01)
(52) U.S. Cl. ....................................... 382/300; 348/448
(58) Field of Classification Search .................. 382/300; 348/448

See application file for complete search history.

(56) References Cited

U.S. PATENT DOCUMENTS

| | | | | |
|---|---|---|---|---|
| 5,936,676 | A * | 8/1999 | Ledinh et al. | 348/452 |
| 5,943,099 | A * | 8/1999 | Kim | 348/448 |
| 6,222,589 | B1 * | 4/2001 | Faroudja et al. | 348/448 |
| 6,928,196 | B1 * | 8/2005 | Bradley et al. | 382/300 |
| 6,965,705 | B1 * | 11/2005 | Ma et al. | 382/300 |
| 7,023,487 | B1 * | 4/2006 | Adams | 348/448 |
| 7,039,254 | B1 * | 5/2006 | Maenaka et al. | 382/300 |
| 7,142,223 | B2 * | 11/2006 | Zhu | 345/606 |
| 7,437,004 | B2 * | 10/2008 | Baatz et al. | 382/224 |
| 7,574,053 | B2 * | 8/2009 | Baatz et al. | 382/224 |
| 2004/0207633 | A1 * | 10/2004 | Zhu | 345/606 |
| 2004/0257467 | A1 * | 12/2004 | Nicolas | 348/452 |
| 2008/0013854 | A1 * | 1/2008 | Crete et al. | 382/268 |
| 2008/0089614 | A1 * | 4/2008 | Roussel et al. | 382/300 |
| 2008/0231748 | A1 * | 9/2008 | Su et al. | 348/452 |

OTHER PUBLICATIONS

De Haan et al, "Deinterlacing—An Overview", Proceedings of the IEEE, Sep. 1, 1998, pp. 1839-1857, XP 011044084, vol. 86, No. 9, ISSN: 0018-9219/98 © 1998 IEEE, NY.

(Continued)

*Primary Examiner* — Bhavesh M Mehta
*Assistant Examiner* — Gandhi Thirugnanam
(74) *Attorney, Agent, or Firm* — Lisa K. Jorgenson; Stephen Bongini; Fleit Gibbons Gutman Bongini & Bianco P.L.

(57) ABSTRACT

Method and devices are provided for processing an image in which a row of pixels with associated light intensity values successively alternates with a row of pixels to which values are to be associated. In each current row of pixels with associated values, pixels are selected which satisfy a selection rule based on the values for the pixels in the current row with associated values and on the values from the previous and/or the next row with associated values, and segments of pixels are detected. In this manner a set of segments is obtained relative to the image being processed, from which a graph of segments is created by linking the segments according to a linking rule. Then the respective values to be associated with at least some of the pixels in the rows to be assigned values are determined by interpolation from segments in the graph which form a path in the graph.

19 Claims, 3 Drawing Sheets

OTHER PUBLICATIONS

Sun, C., "De-Interlacing Of Video Images Using A Shortest Path Technique", IEEE Transactions on Consumer Electronics, IEEE Service Center, ISSN: 0098 3063/00 © 2001 IEEE, May, 2001, pp. 225-230, XP002188607, vol. 47, No. 2, New York, NY.

Bovyrin, A.V., "Fast Extraction of Scene Structure Based on Gradient Runs Analysis", Institute of Electrical and Electronics Engineers, IEEE ICIP, Sep. 22, 2002, pp. 757-760, figures 1-7, vol. 2 of 3, Proceedings 2002 International Conference on Image Processing, ICIP 2002, XP 010607434, ISBN: 0-7803-7622-6/02 © 2002 IEEE, NY.

Roussel et al., "Improvement of Conventional Deinterlacing Methods with Extrema Detection and Interpolation", LNCS—Springer Lecture Notes in Computer Science, ACIVS 2006, Sep. 18, 2006, pp. 384-395, vol. 4179, XP002415852, © Springer—Verlag, Heidelberg, Berlin.

International Preliminary Search Report dated Jan. 19, 2007 for French Application 0608101.

* cited by examiner

IMAGE DEINTERLACING

CROSS-REFERENCE TO RELATED APPLICATIONS

This application is based upon and claims priority from French Patent Application No. 06 08101, filed Sep. 15, 2006, the entire disclosure of which is herein incorporated by reference.

FIELD OF THE INVENTION

The present invention relates to the processing of images, and more particularly to the processing of interlaced images.

BACKGROUND OF THE INVENTION

Interlacing is a technique for processing animated images which is intended to reduce the bandwidth necessary for transmitting a sequence of images by only transmitting half of the information relating to each image.

More specifically, as a general rule, values are associated with the pixels in one out of two rows of pixels in the image. In this manner, a row of pixels with associated values for all its pixels succeeds a row of pixels to be assigned values, and the values to be assigned to the pixels must be determined. To process an interlaced image, it must be determined, on the basis of the values associated with the pixels in the rows of pixels in the image with values, the values to be associated with the pixels in the other rows of pixels in the image, or in other words the rows of pixels to be assigned values.

For this purpose, a deinterlacing algorithm is conventionally applied upon receipt of an interlaced image. One such algorithm determines the value to be associated with a pixel in a row to be assigned values, by using the average of the values associated with the neighboring pixels.

However, this type of algorithm is not suitable for a clean reconstruction of the contours of an object in the image.

Another known deinterlacing algorithm, known as ELA (for "Edge-based Line Average"), aims to improve the rendering of the contours of an interlaced image. An algorithm of this type is generally based on a partial path in the image to be processed via a search window. Such a search window is defined so as to be centered on a pixel for which an associated value must be determined. Then a direction is determined indicating the neighboring pixels within the search window which are the most appropriate for interpolation in order to determine a value to associate with the central pixel.

Thus by scanning a part of the image, there can be determined values to associate with all pixels of the image. U.S. Pat. No. 7,023,487 describes such an algorithm.

However, an image obtained after applying this type of algorithm is sometimes still of insufficient visual quality, particularly when the image represents contrasting areas which are relatively thin in shape, and also when a thin line is oriented in a direction close to the horizontal. One of the consequences for the viewer is a lack of continuity in the visual rendering of the image that is processed in this way.

In addition, such an algorithm is dependent on the size of the search window used to limit the direction of the contour reconstruction: the larger the search window, the greater the risk of an erroneous interpolation. Certain methods based on such search windows propose limiting the risks of erroneous interpolation, but these methods remain complex and difficult to implement.

SUMMARY OF THE INVENTION

An object of the present invention is to reduce these disadvantages.

One embodiment of the present invention provides a method for processing an image comprising R rows of pixels, where R is greater than or equal to 5, and C columns of pixels, with a pixel being defined by an abscissa and an ordinate in a pixel coordinate system for the image. The image includes rows of pixels with associated values in which the pixels have light intensity values associated with them, alternating with rows of pixels to be assigned values in which the pixels are to have light intensity values associated with them. According to the method, in each current row of pixels with associated values, pixels are selected that satisfy a selection rule based on the light intensity values associated with the pixels in the current row of pixels with associated values and on the light intensity values associated with the pixels in the previous row and/or the next row of pixels with associated values, and segments of pixels are detected that each correspond to a group of selected contiguous pixels or to a selected single pixel that is separate from any other selected pixels. There is obtained a set of segments relative to the image being processed, and a graph of segments is created by applying a linking rule to connect the segments together. The respective light intensity values to be associated with at least some of the pixels in the rows to be assigned values are determined by interpolation from the light intensity values associated with the pixels in the segments of the graph forming a path in the graph.

Another embodiment of the present invention provides an image processing device for processing an image comprising R rows of pixels, where R is greater than or equal to 5, and C columns of pixels, with a pixel being defined by an abscissa and an ordinate in a pixel coordinate system for the image. The image includes rows of pixels with associated values in which the pixels have light intensity values associated with them, alternating with rows of pixels to be assigned values in which the pixels are to have light intensity values associated with them. The image processing device includes a detector, a grapher, and an interpolator. The detector, in each current row of pixels with associated values, selects the pixels that satisfy a selection rule based on the light intensity values associated with the pixels in the current row of pixels with associated values and on the light intensity values associated with the pixels in the previous row and/or the next row of pixels with associated values, detects segments of pixels that each correspond to a group of selected contiguous pixels or to a selected single pixel that is separate from any other selected pixels, and obtains a set of segments relative to the image being processed. The grapher creates a graph of segments by applying a linking rule to connect the segments together, and the interpolator determines the respective light intensity values to be associated with at least some of the pixels in the rows to be assigned values by interpolation from the light intensity values associated with the pixels in the segments of the graph forming a path in the graph.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF THE PREFERRED EMBODIMENTS

Figure 1:
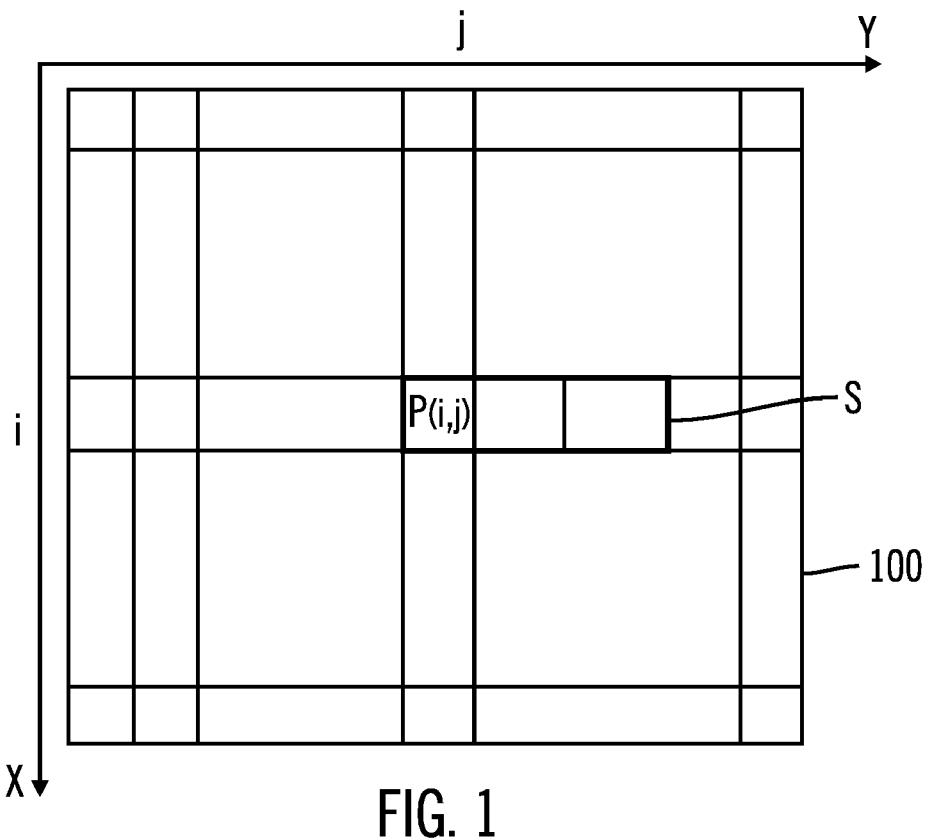
FIG. 1 illustrates an image of pixels in a pixel coordinate system according to one embodiment of the present invention.

Preferred embodiments of the present invention will be described in detail hereinbelow with reference to the attached drawings.

Embodiments of the present invention provide methods for processing an image in at least a first and a second dimension, comprising R rows of pixels, where R is a number greater than or equal to 5, and C columns of pixels, with a pixel defined by an abscissa and an ordinate in a pixel coordinate system for the image. The image has rows of pixels with associated values in which the pixels have light intensity values associated with them, alternating with rows of pixels to be assigned values in which the pixels are to have light intensity values associated with them. According to the method of one embodiment, in each current row of pixels with associated values, there are selected the pixels which satisfy a selection rule based on the light intensity values associated with the pixels in the current row of pixels with associated values, as well as on the light intensity values associated with the pixels in the previous row of pixels with associated values and/or the next row of pixels with associated values in the image; and segments of pixels are detected, with each segment corresponding to a group of selected contiguous pixels or to a selected single pixel separate from any other selected pixels. There is obtained a set of segments relative to the image currently being processed, and in the set of segments a graph of segments is created by applying a linking rule to connect the segments together. There are determined the light intensity values to be associated with at least some of the pixels in the rows to be assigned values, by interpolation from the light intensity values associated with the pixels in the segments of the graph forming a path in the graph.

Thus, by applying an appropriate selection rule, it is possible to determine zones in the image where the quality may be insufficient, particularly when thin lines are present. Based on the light intensity values for the pixels in three rows of pixels with associated values, which are the current row of pixels with associated values as well as the previous row of pixels with associated values and the next row of pixels with associated values, it is possible to determine the zones in the image which are thin and contrasting.

Then the information obtained is transferred into a graph coordinate system, so as to obtain the light intensity values for the pixels to be included in an interpolation and thus the respective light intensity values to be associated with the pixels in the row to be assigned values.

Such measures improve the determination of pixel values in zones where the quality may appear insufficient, in a simple manner which avoids the disadvantages of methods based on manipulation of a search window.

In one embodiment of the present invention, the selection rule aims to determine the zones in the image corresponding to a thin and contrasting edge.

For this purpose, there can be determined maximum and minimum light intensities, or light intensities, in the vertical direction of the image.

The selection rule of this embodiment thus can select pixels corresponding to maximum light intensities. For example, the pixel selection rule can select pixels for which the associated value exceeds the maximum value in a set of values comprising a first value corresponding to the sum of a first threshold value plus the value associated with the pixel in the same column in the previous row of pixels with associated values, and a second value corresponding to the sum of a second threshold value plus the value associated with the pixel in the same column in the next row of pixels with associated values.

In some embodiments of the present invention, this selection rule can select pixels corresponding to minimum intensities.

For example, the pixel selection rule can select pixels for which the associated value is less than a minimum value from a set of values comprising a first value corresponding to the difference between the value associated with the pixel in the same column in the previous row of pixels with associated values and a first threshold value, and a second value corresponding to the difference between the value associated with the pixel in the same column in the next row of pixels with associated values and a second threshold value.

In one embodiment of the present invention, the linking rule for creating a graph of segments links a first segment (S1) and a second segment (S2) if the following equation is true:

$$D(S1,S2) < \min(L1 + d_{threshold}, L2 + d_{threshold}),$$

where D(S1, S2) corresponds to the Euclidean distance between the closest end points of the first and second segments, L1 and L2 correspond to the respective lengths of the first and second segments, and $d_{threshold}$ corresponds to a threshold value for the distance.

A graph simplification rule can advantageously be applied between creating the graph of segments and determining the light intensity values.

For example, the graph simplification rule can comprise eliminating two outgoing connections of a segment when the outgoing connections are located on the same side of the segment.

The simplification rule can also comprise eliminating an outgoing connection from a segment when the outgoing connection is located on the same side of the segment as an incoming connection.

In one embodiment of the present invention, the determination of the light intensity values is achieved by traveling the graph and determining a first segment and a second segment of the graph which are located in the first and second successive rows of pixels with values already assigned in the image; determining the length of a segment to be interpolated, on the basis of the first and second segments, in the row of pixels to be assigned values located between the first and second row of pixels with values already assigned; and determining the respective values to be associated with the pixels in the segment to be interpolated by respective interpolations of the light intensity values associated with the pixels in the first and second segments.

In this case, the ordinate $Y_{startInt}$ for the starting pixel and the ordinate $Y_{endInt}$ for the ending pixel in the segment to be interpolated can be determined using the following equations:

$$Y_{startInt} = Y_{start1} + \left|\frac{Y_{start2} - Y_{start1}}{2}\right| \text{ and}$$

$$Y_{endInt} = Y_{end1} + \left|\frac{Y_{end2} - Y_{end1}}{2}\right|$$

where $Y_{start1}$, $Y_{start2}$, $Y_{end1}$ and $Y_{end2}$ are the respective ordinates for the starting and ending pixels of the first and second segments.

The light intensity value determined by interpolating a pixel P(i,j) in the segment to be interpolated in the row i to be assigned values can then satisfy the following equation:

$$val(P(i, j)) = \frac{1}{2} val\left(P\left(i-1, Y_{start1} + E\left(\frac{j \times L_1}{L_{Int}}\right)\right)\right) + \frac{1}{2} val\left(P\left(i+1, Y_{start2} + E\left(\frac{j \times L_2}{L_{Int}}\right)\right)\right)$$

where j is between $Y_{startInt}$ and $Y_{endInt}$, the function E returns the integer closest to the number passed as an argument, and $L_{Int}$ is the length of the segment to be interpolated in the row i of pixels to be assigned values.

It is also possible to interpolate p pixels preceding the segment to be interpolated and s pixels following the segment to be interpolated, on the basis of the values of the p pixels preceding the first and second segments and the s pixels following the first and second segments in the rows of pixels with associated values in the first and second segments respectively.

In this manner, it is advantageously possible to smooth the visual rendering of the image in the area of the interpolation previously performed.

The present invention also provides an image processing device that implements such an image processing method.

The present invention further provides a computer readable medium encoded with a computer program comprising instructions for implementing such an image processing method when the computer program is executed by a computer system or an image processing device.

Exemplary embodiments of the present invention will now be described in detail with reference to FIGS. 1-10. The present invention is described below as it applies to two-dimensional images. However, there is no limitation to the dimensions of the image that can be processed by a method according to an embodiment of the present invention. From the following description, one of ordinary skill in the art can easily apply such an image processing method to images having more than two dimensions.

In addition, the present invention is not limited with respect to the encoding used for the information associated with a pixel. No matter what encoding is used, the light intensity value associated with a pixel is what is considered (meaning the light intensity associated with the pixel). This light intensity information is available regardless of the video encoding that is used.

FIG. 1 illustrates an image 100 according to one embodiment of the present invention, in which the position of a pixel P(i,j) is defined by its coordinates in a system with a vertical axis of abscissas X and a horizontal axis of ordinates Y for a two-dimensional image.

The present invention is described below as it applies to interlaced images which successively alternate a row of pixels with associated values and a row of pixels to be assigned values. One of ordinary skill in the art can easily apply the principles of the present invention to other formats, with for example a different percentage of rows of pixels with associated values relative to the rows of pixels to be assigned values, or a pixel format in which the columns of pixels with associated values alternate with columns of pixels to be assigned values.

The term "row of pixels with associated values" means a row of pixels for which respective values are associated with the pixels in the row in question. The term "row of pixels to be assigned values" means a row of pixels for which the respective values are to be determined and associated with the pixels in the row in question.

In the example discussed below, the rows of pixel with an even index in the image 100 are the rows of pixels with associated values, and the rows of pixels with an odd index are the rows of pixels to be assigned values.

Figure 2:
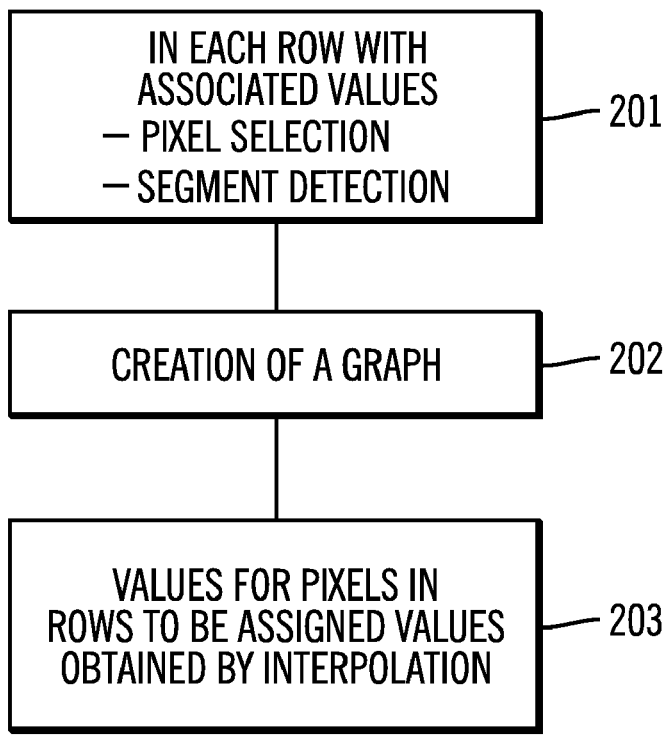
FIG. 2 illustrates an image processing method according to one embodiment of the present invention.

FIG. 2 illustrates an image processing method according to one embodiment of the present invention.

In step 201, the image 100 is scanned by rows of pixels. For each row of pixels with associated values, meaning each row with an even index in this example, pixels are selected by applying a pixel selection rule which is partly based on the values for the pixels in the current row with associated values, and partly on the values for the pixels in the previous row with associated values and/or the values for the pixels in the next row with associated values. When the current row with associated values has a previous and a next row with associated values, the values associated with them are preferably taken into account. When this is not the case, for example in the first or last row with associated values in the image, only the values associated with the available row are included in this embodiment.

In this embodiment of the present invention, such a selection rule is applied by selecting a pixel in the current row of pixels with associated values, as a function of the value of the pixel in the same column in the previous row of pixels with associated values and the value of the pixel in the same column in the next row of pixels with associated values.

The quality of the image being processed can be corrected, for the maximum and/or minimum light intensities presented by a relatively thin shape. These criteria correspond to the parts of the image which are likely to be poorly rendered.

In such case, there should be determined the areas of contrasting brightness which are thin in shape.

The selection rule for the maximum light intensities can, for example, select the pixels P(i,j) in the current row i of pixels with associated light intensity values for which the associated values satisfy the following equation:

$$val(P(i,j)) > \text{Max}(val(P(i-2,j)) + T1; val(P(i+2,j)) + T2)$$

where the current row i is a row of pixels with associated values, and T1 and T2 correspond to contrast threshold values.

In this exemplary embodiment of the present invention, the values T1 and T2 are identical and are equal to a value of about 16, expressed in luminance.

Then all columns of the row of index i are examined. The method then advances to the next row with associated values, which is the row of index i+2, and the same process is performed.

At the end of this phase of examining the image, a set of pixels which meets the selection rule has been determined, meaning in this case that they represent the maximum intensities in the vertical direction.

The selection rule can also selection the pixels which present minimum light intensities in the vertical direction. For this purpose, one can select the pixels P(i,j) in the current row of index i of pixels with associated values, if the light intensity value which is associated with them satisfies the following equation:

$$val(P(i,j)) < Min(val(P(i-2,j))-T'1; val(P(i+2,j))-T'2)$$

Then segment detection is performed by grouping, by rows of pixels with associated values, the contiguous pixels which were selected. The selected pixels which are disjoint from other pixels form a segment of one pixel, meaning a segment with a length of 1.

Then in step 202, there is a change from the pixel coordinate system described above to a segment coordinate system, which is then used to create a graph of segments. More specifically, each segment is identified in this segment coordinate system by coordinates which represent the index of the row of pixels with associated values to which it belongs and the ordinate of the first pixel in it. It is also identified by its length. A graph of segments is then created, defining a directed path through the segments.

Next, in step 203, interpolation is applied by traveling through the graph and interpolating segments in the rows of pixels to be assigned values which are located between two consecutive segments in the graph. In this manner there are obtained light intensity values to associate with the pixels in the segments to be interpolated on the basis of the light intensity values associated with the pixels in the graph segments which "bracket" the segment to be interpolated.

Figure 3:
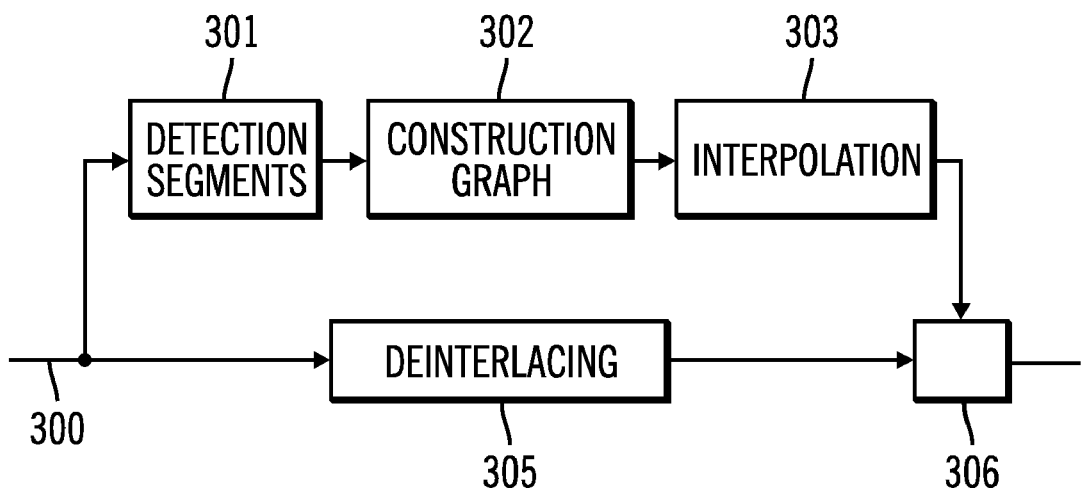
FIG. 3 illustrates an image processing device that applies a method according to an embodiment of the present invention in a deinterlacing process.

FIG. 3 illustrates an image processing device that applies a method according to one embodiment of the present invention in a deinterlacing process.

Some values to be associated with the pixels in the rows to be assigned values in the image 100 are determined by applying the method according to this embodiment of the present invention, and the other values to be associated with the other pixels in the rows to be assigned values are determined by applying a well known algorithm.

In this context, the data concerning the image 100 enter via the input 300. The data is then processed by applying the method according to this embodiment of the present invention, during which a segment detector 301 detects segments in the image, a grapher 302 builds a graph of these segments, and then an interpolator 303 performs an interpolation of the values in correspondence with the graph. The data is also processed by a deinterlacer 305 that applying a known deinterlacing process.

Then at output 306 there are associated the determined values with their respective corresponding pixels using the method of this embodiment of the present invention, and also there are associated the values determined by applying the known deinterlacing process to the other pixels in the processed image 100.

The following is an exemplary description of applying the present invention to maximum light intensities. However, the present invention is not so limited. For example, it is easy to deduce from this how to apply a selection rule which selects pixels with minimum light intensities.

When the pixel selection is performed in all rows with assigned values in the image, the corresponding segments are detected in step 201. In this context, a segment consists of pixels selected from the same row that are contiguous. In addition, an isolated selected pixel in a row with associated values, meaning a selected pixel which has no neighbors, also forms a segment. Through this detection of segments in the image, one can advance from a pixel coordinate system to a segment coordinate system.

For this purpose, a segment detected in this manner can be identified by its coordinates, which can for example be the index of the row in which the segment is found and the index of the starting column of the segment. Also assigned to such a segment, in addition to its coordinates, is a length which can be expressed as the number of pixels contained in the segment in question. Also assigned to the segment is a type identifier, which is either a "maximum" type identifier or a "minimum" type identifier in this example. Such a segment S is illustrated in FIG. 1. This segment S has coordinates (i, j), a length of 3, and a maximum type for example.

Figure 4:
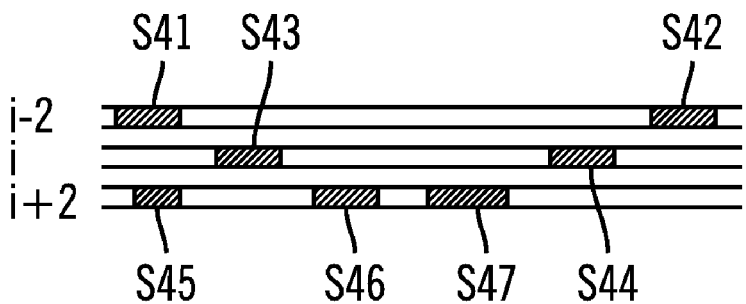
FIG. 4 illustrates an exemplary set of segments obtained according to an image processing method of one embodiment of the present invention.

FIG. 4 illustrates an exemplary set of segments obtained according to an image processing method of one embodiment of the present invention from five rows with an index between i−2 and i+2. The rows of index i−2, i and i+2 are rows of pixels with values already assigned. Segments S41 and S42 were detected in the row of index i−2, segments S43 and S44 were detected in the row of index i, and segments S45, S46 and S47 were detected in the row of index i+2.

Figure 5:
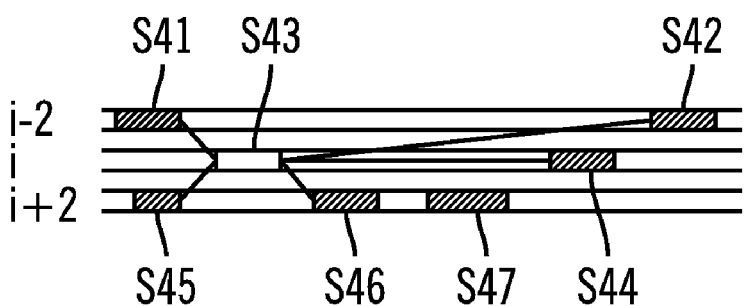
FIGS. 5, 6 and 7 illustrate the construction of a graph according to one embodiment of the present invention.
Figure 6:
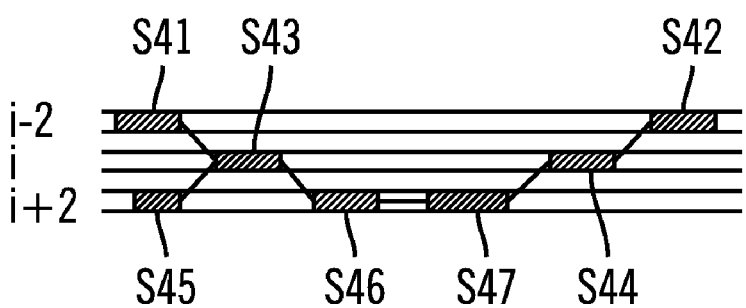
Figure 7:
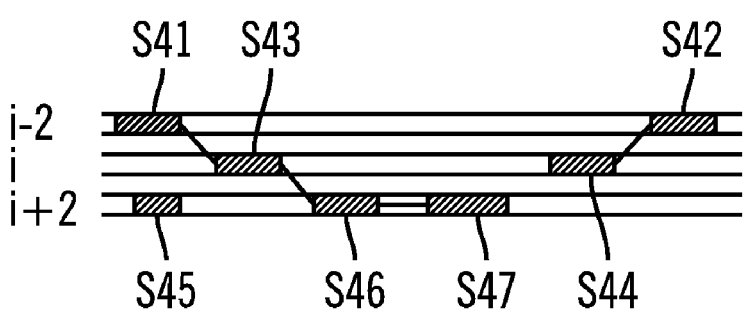

FIGS. 5, 6 and 7 illustrate the construction and simplification of a segment graph in accordance with one embodiment of the present invention. In the present example, one or more connected graphs of maximums are obtained.

A detected segment potentially has at most six direct neighbors of the same type, in the sense of the present invention, in the rows of index i−2, i, and i+2. It can have three neighbors on one side and three neighbors on the other. FIG. 5 illustrates the possible neighbors of segment S43 in the example illustrated in FIG. 4. Thus, segment S43 has as neighbor segments S41, S42, S44, S45, and S46.

To build the graph of segments in this embodiment of the present invention, those neighbors are included which are closest in the sense of the Euclidian distance calculated between the closest ends of the two segments in question. By connecting segment S43 to its closest neighbors, a graph is built as illustrated in FIG. 6. When segment S43 is at an equal distance from the two closest segments, these two segments are connected to S43. Such is the case for segments S41 and S45.

In one construction of a graph according to this embodiment of the present invention, the links between the different segments are bi-directional.

A threshold value $d_{threshold}$ can be used to avoid connecting two segments which are too far apart and to provide a reliable determination of values by interpolation.

Thus a condition can be introduced which checks the distance between two segments S1 and S2 according to the equation:

$$D(S1,S2) < min(L1+d_{threshold}, L2+d_{threshold})$$

where L1 and L2 are the respective lengths of segments S1 and S2.

In this embodiment of the present invention, the value $d_{threshold}$ is equal to 2 pixels.

It is possible to store in the segment itself its links with its closest neighbors as defined above, in the form of pointers to the closest neighbors.

In general, because of the very nature of local extrema which relate to a thin structure in the image, a segment has at most four closest neighbors, two on each side, as illustrated in FIG. 6.

FIG. 7 illustrates the graph in FIG. 6 after simplification. In this embodiment of the present invention, the graph obtained after finding the closest segments as described above is simplified by applying a known graph traversing algorithm.

This simplification preferably eliminates certain links and can then result in multiple subgraphs.

For this purpose it is possible, for example, to delete links so as to give preference to subgraphs with a predominant direction. It is also preferable to delete links which were created erroneously.

Graphs containing only one segment or multiple segments in a single row are preferably deleted. A segment can be connected to another segment by six different directions, which can be identified as the directions Northwest, West, Southwest, Northeast, East, and Southeast. When traveling a graph depth-first, the direction of entry corresponds to the direction from which the segment is accessed, and therefore the starting segment for the graph has no associated direction of entry. Then the directions of exit correspond to all links of the segment except the direction of entry.

In this context, the graph simplification according to this embodiment of the present invention includes applying a first simplification rule consisting of deleting two outgoing links when they are situated on the same side of the segment in question.

This first simplification rule avoids incorrectly linking potentially different structures, meaning subgraphs of the graph currently being simplified.

The graph simplification according to this embodiment of the present invention also includes applying a second simplification rule which consists of deleting an outgoing link when it is located on the same side as the incoming link for a given segment.

This second simplification rule allows retaining only thin structures and not structures which zigzag.

The subgraphs obtained at the end of this graph simplification correspond to trees with a single branch. Long rectilinear or curving structures can be formed in this way.

It is possible to apply any rule which simplifies the graph and increases the reliability of the values obtained when performing the subsequent interpolation. In particular, a weighting coefficient can be assigned to the different links. Such a coefficient could be determined, for example, on the basis of a mean light intensity value of the segments.

Figure 8:
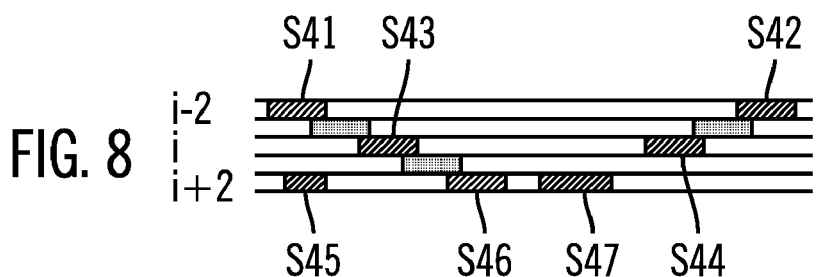
FIG. 8 illustrates the interpolation of pixel values according to one embodiment of the present invention.

FIG. 8 illustrates interpolation of the values of pixels according to this embodiment of the present invention. This interpolation culminates in the determination of the values to be associated with at least a some of the pixels in the rows of pixels to be assigned values.

In this embodiment of the present invention, this interpolation occurs in a forward pass, meaning from west to east in each branch of the subgraphs obtained after the graph simplification.

Two segments, S1 in row i−1 and S2 in row i+1, with respective lengths of L1 and L2, are connected in a subgraph. Segment S1 has a start ordinate of $Y_{start1}$ and an end ordinate of $Y_{end1}$. Segment S2 has a start ordinate $Y_{start1}$ and an end ordinate of $Y_{end1}$.

By interpolation from the values of the pixels in these two segments, values are obtained to associate with a segment to be interpolated Sint in the row of pixels of index i, which is a row of pixels to be assigned values. This segment Sint has start and end ordinates of $Y_{startInt}$ and $Y_{endInt}$ respectively, which satisfy the following equations:

$$Y_{startInt} = Y_{start1} + \left|\frac{Y_{start2} - Y_{start1}}{2}\right| \text{ and}$$

$$Y_{endInt} = Y_{end1} + \left|\frac{Y_{end2} - Y_{end1}}{2}\right|$$

Then the respective values to associate with the different pixels in the segment to be interpolated in row i are determined by applying the following equation:

$$val(P(i, j)) = \frac{1}{2}val\left(P\left(i-1, Y_{start1} + E\left(\frac{j \times L_1}{L_{Int}}\right)\right)\right) + \frac{1}{2}val\left(P\left(i+1, Y_{start2} + E\left(\frac{j \times L_2}{L_{Int}}\right)\right)\right)$$

where j is between $Y_{startInt}$ and $Y^{endInt}$ (the ordinates for the pixels located at the ends of the segment to be interpolated), the function E returns the integer closest to its argument, and where $L_{Int}$ is the length of the segment to be interpolated in the row of index i to be assigned values.

$L_{Int}$ therefore satisfies the following equation:

$$L_{Int} = Y_{endInt} - Y_{startInt} + 1$$

Figure 9:
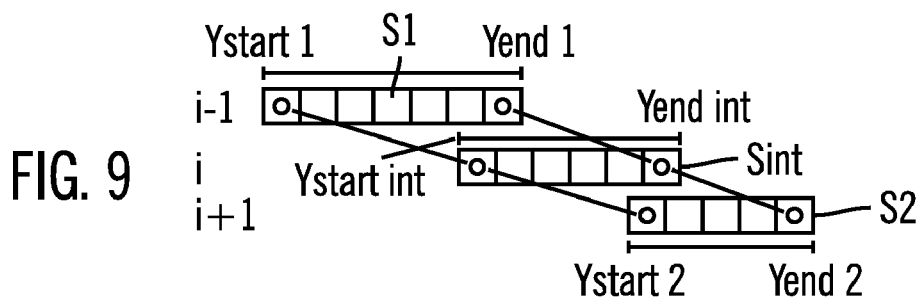
FIG. 9 illustrates this interpolation in the context of FIGS. 5-7.

FIG. 9 illustrates the segments interpolated in the context of FIGS. 5-7 by applying the interpolation described above with reference to FIG. 8. In this manner there are obtained the respective values to associate with the pixels in the segments 91 on the basis of an interpolation from the values of the pixels in segments S41 and S43, the respective values to associate with the pixels in the segments 92 on the basis of an interpolation from the values of the pixels in segments S43 and S43, and the respective values to associate with the pixels in the segments 93 on the basis of an interpolation from the values of the pixels in segments S42 and S44.

Figure 10:
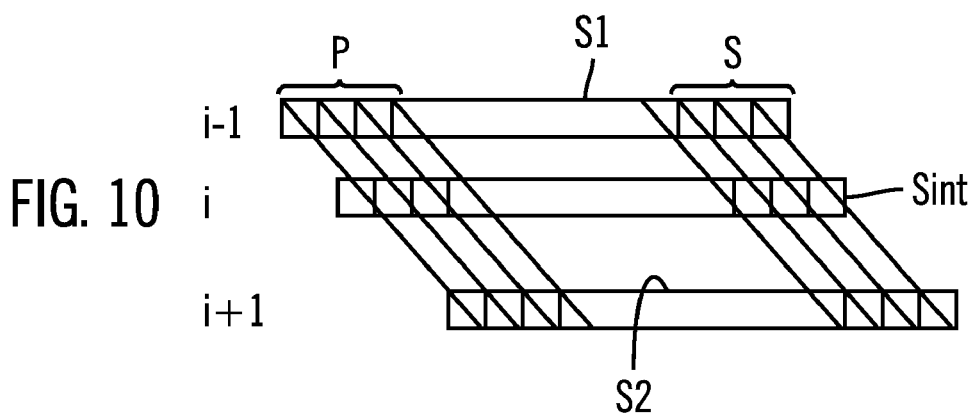
FIG. 10 illustrates a supplemental interpolation process according to one embodiment of the present invention.

FIG. 10 illustrates an additional interpolation process according to one embodiment of the present invention. In order to guarantee better continuity of the values of pixels in proximity to the thin contrasting zones as detected and corrected by the above interpolation, the interpolation as described above can be reapplied in an additional interpolation process to a certain number of pixels which precede and follow the segment to which an interpolation has just been applied as illustrated in FIG. 8 and described with reference to this figure in a previous section.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for processing an image in at least first and second dimensions, the image comprising R rows of pixels, where R is greater than or equal to 5, and C columns of pixels, with a pixel being defined by an abscissa and an ordinate in a pixel coordinate system for the image, the image comprising rows of pixels with associated values in which the pixels have light intensity values associated with them, alternating with rows of pixels to be assigned values in which the pixels are to have light intensity values associated with them, the method comprising the steps of:

in each current row of pixels with associated values:

selecting the pixels that satisfy a selection rule based on the light intensity values associated with the pixels in the current row of pixels with associated values, and on at least one of the light intensity values associated with the pixels in the previous row of pixels with associated values and the next row of pixels with associated values, and detecting segments of pixels, each of the segments corresponding to a group of selected contiguous pixels or to a selected single pixel that is separate from any other selected pixels;

obtaining a set of segments relative to the image being processed;

in the set of segments, creating a graph of segments by applying a linking rule to connect the segments together; and determining the respective light intensity values to be associated with at least some of the pixels in the rows to be assigned values by interpolation from the light intensity values associated with the pixels in the segments of the graph forming a path in the graph.

2. The method according to claim 1, wherein the selection rule selects pixels corresponding to maximum light intensities.

3. The method according to claim 2, wherein the pixel selection rule selects a pixel which has an associated light intensity value which is greater than the maximum value within a set of values comprising:

a first value corresponding to the sum of a first threshold value and the light intensity value associated with a pixel belonging to the same column of pixels as the current pixel and to the row of pixels with associated values which precedes the row with associated values of the current pixel, and a second value corresponding to the sum of a second threshold value and the light intensity value associated with a pixel belonging to the same column of pixels as the current pixel and to the row of pixels with associated values which follows the row with associated values of the current pixel.

4. The method according to claim 1, wherein the selection rule selects pixels corresponding to minimum light intensities.

5. The method according to claim 4, wherein the pixel selection rule selects a pixel which has an associated light intensity value which is less than the minimum value within a set of values comprising:

a first value corresponding to the difference between the light intensity value associated with a pixel belonging to the same column of pixels as the current pixel and to the row of pixels with associated values which precedes the row with associated values of the current pixel, and a first threshold value, and a second value corresponding to the difference between the light intensity value associated with a pixel belonging to the same column of pixels as the current pixel and to the row of pixels with associated values which follows the row with associated values of the current pixel, and a second threshold value.

6. The method according to claim 1, wherein the linking rule links a first segment S1 and a second segment S2 if the following equation is satisfied:

$$D(S1,S2) < \min(L1 + d_{threshold}, L2 + d_{threshold})$$

where $D(S1,S2)$ corresponds to the Euclidian distance between the closest ends of the first and second segments, L1 and L2 correspond to the respective lengths of the first and second segments, and $d_{threshold}$ corresponds to a threshold value for the distance.

7. The method according to claim 1, further comprising the step of applying a graph simplification rule after the creating step and before the determining step.

8. The method according to claim 7, wherein the graph simplification rule comprises deleting two outgoing links from a segment when the two outgoing links are located on the same side of the segment.

9. The method according to claim 7, wherein the graph simplification rule comprises deleting an outgoing link from a segment when the outgoing link is located on the same side of the segment as an incoming link.

10. The method according to claim 1, wherein the determining step comprises the sub-steps of:

traveling the graph and determining a first segment S1 and a second segment S2 of the graph which are located in the first and second successive rows of pixels with assigned values in the image;

determining the length of a segment to be interpolated Sint on the basis of the first and second segments, in the row of pixels to be assigned values which is located between the first and second rows of pixels with associated values; and determining values to be associated with the pixels in the segment to be interpolated by interpolations of the light intensity values associated with the pixels in the first and second segments.

11. The method according to claim 10, wherein in the sub-step of determining the length of the segment to be interpolated, the ordinate $Y_{startInt}$ for the starting pixel and the ordinate $Y_{endInt}$ for the ending pixel of the segment to be interpolated Sint are determined by applying the equations:

$$Y_{startInt} = Y_{start1} + \left|\frac{Y_{start2} - Y_{start1}}{2}\right| \text{ and}$$

$$Y_{endInt} = Y_{end1} + \left|\frac{Y_{end2} - Y_{end1}}{2}\right|$$

where $Y_{start1}$, $Y_{start2}$, $Y_{end1}$, and $Y_{end2}$ are the respective ordinates for the start and end pixels of the first and second segments S1 and S2.

12. The method according to claim 11, wherein the light intensity value determined by interpolation of a pixel P(i,j) in the segment to be interpolated in the row of index i to be assigned values satisfies the equation:

$$val(P(i,j)) = \frac{1}{2}val\left(P\left(i-1, Y_{start1} + E\left(\frac{j \times L_1}{L_{Int}}\right)\right)\right) + \frac{1}{2}val\left(P\left(i+1, Y_{start2} + E\left(\frac{j \times L_2}{L_{Int}}\right)\right)\right)$$

where j is between $Y_{startInt}$ and $Y_{endInt}$, the function E returns the integer closest to the number passed as an argument, val(P(i,j)) is the light intensity value associated with pixel P(i,j), and $L_{Int}$ is the length of the segment to be interpolated in the row of index i of pixels to be assigned values.

13. The method according to claim 10, wherein p pixels preceding the segment to be interpolated and s pixels following the segment to be interpolated are also interpolated on the basis of the values of the p pixels preceding the first and second segments and the s pixels following the first and second segments in the rows of pixels with values already assigned of the first and second segments respectively.

14. An image processing device for processing an image, the image comprising R rows of pixels, where R is greater than or equal to 5, and C columns of pixels, with a pixel being defined by an abscissa and an ordinate in a pixel coordinate system for the image, the image comprising rows of pixels with associated values in which the pixels have light intensity values associated with them, alternating with rows of pixels to be assigned values in which the pixels are to have light intensity values associated with them, the image processing device comprising:

a detector for, in each current row of pixels with associated values:
selecting the pixels that satisfy a selection rule based on the light intensity values associated with the pixels in the current row of pixels with associated values, and on at least one of the light intensity values associated with the pixels in the previous row of pixels with associated values and the next row of pixels with associated values,
detecting segments of pixels, each of the segments corresponding to a group of selected contiguous pixels or to a selected single pixel that is separate from any other selected pixels, and
obtaining a set of segments relative to the image being processed;
a grapher for creating a graph of segments by applying a linking rule to connect the segments together; and
an interpolator for determining the respective light intensity values to be associated with at least some of the pixels in the rows to be assigned values by interpolation from the light intensity values associated with the pixels in the segments of the graph forming a path in the graph.

15. The image processing device according to claim 14, wherein the selection rule selects pixels corresponding to at least one of maximum light intensities and minimum light intensities.

16. The image processing device according to claim 14, wherein the interpolator:
travels the graph and determining a first segment S1 and a second segment S2 of the graph which are located in the first and second successive rows of pixels with assigned values in the image,
determines the length of a segment to be interpolated Sint on the basis of the first and second segments, in the row of pixels to be assigned values which is located between the first and second rows of pixels with associated values, and
determines values to be associated with the pixels in the segment to be interpolated by interpolations of the light intensity values associated with the pixels in the first and second segments.

17. A non-transitory computer readable medium encoded with a computer program for processing an image in at least first and second dimensions, the image comprising R rows of pixels, where R is greater than or equal to 5, and C columns of pixels, with a pixel being defined by an abscissa and an ordinate in a pixel coordinate system for the image, the image comprising rows of pixels with associated values in which the pixels have light intensity values associated with them, alternating with rows of pixels to be assigned values in which the pixels are to have light intensity values associated with them, the computer program comprising instructions for:

in each current row of pixels with associated values:
selecting the pixels that satisfy a selection rule based on the light intensity values associated with the pixels in the current row of pixels with associated values, and on at least one of the light intensity values associated with the pixels in the previous row of pixels with associated values and the next row of pixels with associated values, and
detecting segments of pixels, each of the segments corresponding to a group of selected contiguous pixels or to a selected single pixel that is separate from any other selected pixels;
obtaining a set of segments relative to the image being processed;
in the set of segments, creating a graph of segments by applying a linking rule to connect the segments together; and
determining the respective light intensity values to be associated with at least some of the pixels in the rows to be assigned values by interpolation from the light intensity values associated with the pixels in the segments of the graph forming a path in the graph.

18. The non-transitory computer readable medium according to claim 17, wherein the selection rule selects pixels corresponding to maximum light intensities.

19. The non-transitory computer readable medium according to claim 17, wherein the determining of the respective light intensity values to be associated with at least some of the pixels in the rows to be assigned values comprises:
traveling the graph and determining a first segment S1 and a second segment S2 of the graph which are located in the first and second successive rows of pixels with assigned values in the image;
determining the length of a segment to be interpolated Sint on the basis of the first and second segments, in the row of pixels to be assigned values which is located between the first and second rows of pixels with associated values; and
determining values to be associated with the pixels in the segment to be interpolated by interpolations of the light intensity values associated with the pixels in the first and second segments.

* * * * *